(12) United States Patent
Kim et al.

(10) Patent No.: US 9,645,980 B1
(45) Date of Patent: May 9, 2017

(54) VERIFICATION OF NATIVE APPLICATIONS FOR INDEXING

(71) Applicant: Google Inc., Mountain View, CA (US)

(72) Inventors: Dong Kim, San Jose, CA (US); Ji Lee, Los Gatos, CA (US); Vivian Tan Lum, Los Altos, CA (US)

(73) Assignee: Google Inc., Mountain View, CA (US)

( * ) Notice: Subject to any disclaimer, the term of this patent is extended or adjusted under 35 U.S.C. 154(b) by 190 days.

(21) Appl. No.: 14/663,149

(22) Filed: Mar. 19, 2015

Related U.S. Application Data

(60) Provisional application No. 61/955,762, filed on Mar. 19, 2014.

(51) Int. Cl.
| | | |
|---|---|---|
| *G06F 17/00* | (2006.01) | |
| *G06F 17/22* | (2006.01) | |
| *G06F 9/54* | (2006.01) | |
| G06F 17/30 | (2006.01) | |
| G06F 9/445 | (2006.01) | |
| G06F 9/44 | (2006.01) | |
| H04L 29/08 | (2006.01) | |

(52) U.S. Cl.
CPC ............ *G06F 17/2235* (2013.01); *G06F 9/54* (2013.01); *G06F 8/61* (2013.01); *G06F 9/4443* (2013.01); *G06F 17/2247* (2013.01); *G06F 17/30864* (2013.01); *G06F 17/30867* (2013.01); *H04L 67/02* (2013.01)

(58) Field of Classification Search
CPC ........... G06F 17/3095; G06F 17/30864; G06F 17/30867; G06F 17/2247; G06F 8/61; G06F 9/4443; G06F 9/54; H04L 67/02

USPC .................................................. 715/205–207
See application file for complete search history.

(56) References Cited

U.S. PATENT DOCUMENTS

| | | |
|---|---|---|
| 6,418,433 B1 | 7/2002 | Chakrabarti |
| 6,832,376 B1 | 12/2004 | Sievert |
| 7,234,139 B1 | 6/2007 | Feinberg |
| 7,617,225 B2 | 11/2009 | Arrouye |
| 8,060,487 B2 | 11/2011 | Schmidt-Karaca |
| 8,086,957 B2 | 12/2011 | Bauchot |
| 8,433,620 B2 | 4/2013 | Futty |
| 8,458,384 B2 | 6/2013 | Johnson |
| 8,510,764 B1 | 8/2013 | Deselaers |
| 8,515,979 B2 | 8/2013 | Mehta |

(Continued)

FOREIGN PATENT DOCUMENTS

| | | |
|---|---|---|
| EP | 2474905 A2 | 7/2012 |
| EP | 2495670 A1 | 9/2012 |

OTHER PUBLICATIONS

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.

(Continued)

*Primary Examiner* — Quoc A Tran
(74) *Attorney, Agent, or Firm* — Fish & Richardson P.C.

(57) ABSTRACT

Methods, systems, and apparatus, including computer programs encoded on a computer storage medium, for verifying the ability of a processing system to crawl and index a native application and links for provided for the native application, and to make available reporting data that details the results of one or more verification tests.

17 Claims, 5 Drawing Sheets

(56) References Cited

U.S. PATENT DOCUMENTS

| | | | |
|---|---|---|---|
| 8,554,345 | B2 | 10/2013 | Fernandez |
| 8,595,450 | B2 | 11/2013 | Nguyen |
| 8,660,849 | B2 | 2/2014 | Gruber |
| 8,688,726 | B2 | 4/2014 | Mahajan |
| 8,874,569 | B2 | 10/2014 | Miller |
| 9,043,333 | B1 | 5/2015 | Look |
| 9,104,787 | B2 | 8/2015 | Kumar |
| 9,251,224 | B2 | 2/2016 | Imaizumi |
| 2002/0144003 | A1 | 10/2002 | Jin |
| 2004/0030882 | A1 | 2/2004 | Forman |
| 2007/0209080 | A1 | 9/2007 | Ture |
| 2010/0257466 | A1 | 10/2010 | Wroblewski |
| 2010/0306191 | A1 | 12/2010 | LeBeau |
| 2011/0252038 | A1 | 10/2011 | Schmidt |
| 2011/0258049 | A1* | 10/2011 | Ramer ............ G06F 17/30867 705/14.66 |
| 2011/0276568 | A1 | 11/2011 | Fotev |
| 2011/0314004 | A1 | 12/2011 | Mehta |
| 2012/0016678 | A1 | 1/2012 | Gruber |
| 2012/0124061 | A1 | 5/2012 | Macbeth et al. |
| 2012/0144281 | A1 | 6/2012 | Schechter |
| 2012/0173692 | A1* | 7/2012 | Lakes ................. H04L 67/327 709/223 |
| 2012/0179706 | A1 | 7/2012 | Hobbs |
| 2012/0179955 | A1 | 7/2012 | French |
| 2012/0284247 | A1 | 11/2012 | Jiang |
| 2012/0284256 | A1 | 11/2012 | Mahajan |
| 2012/0290584 | A1 | 11/2012 | De |
| 2012/0316955 | A1 | 12/2012 | Panguluri et al. |
| 2012/0323898 | A1 | 12/2012 | Kumar |
| 2013/0006897 | A1 | 1/2013 | Jain |
| 2013/0047100 | A1* | 2/2013 | Kroeger ............... G06F 3/0488 715/760 |
| 2013/0110815 | A1 | 5/2013 | Tankovich |
| 2013/0111328 | A1 | 5/2013 | Khanna |
| 2013/0122861 | A1 | 5/2013 | Kim |
| 2013/0124606 | A1 | 5/2013 | Carpenter |
| 2013/0191360 | A1 | 7/2013 | Burkard |
| 2013/0232256 | A1 | 9/2013 | Lee |
| 2013/0283285 | A1 | 10/2013 | Zhou |
| 2013/0298007 | A1 | 11/2013 | Cullen |
| 2013/0325856 | A1 | 12/2013 | Soto |
| 2014/0136691 | A1 | 5/2014 | Crosby |
| 2014/0188897 | A1 | 7/2014 | Baker |
| 2014/0245141 | A1 | 8/2014 | Yeh |
| 2014/0359598 | A1 | 12/2014 | Oliver |
| 2015/0006328 | A1 | 1/2015 | Yoon |
| 2015/0038161 | A1 | 2/2015 | Jakobson |

OTHER PUBLICATIONS

"App Linking," [online][Retrieved on Jan. 7, 2014]; Retrieved from the Internet URL: https://developers.facebook.com/docs/android/link-to-your-native-app/; 14 pages.

"Class Gecko View Content," [online][Retrieved on Jan. 2, 2014]; Retrieved from the Internet URL: people.mozilla.org/~mfinkle/geckoview/docs/org/Mozilla/gecko/GeckoViewContent.html; 4 pages.

"Deeplink.me Lets Mobile Users Navigate Through a "Web" of Apps," [online][Retrieved on Dec. 13, 2013]; Retrieved from the Internet URL: techcrunch.com/2013/05/22/new-service-called-deeplink-me-will-let-mobile-users-navigate-through-a-web-of-apps/; 8 pages.

"Frequently Asked Questions—General Information," [online][Retrieved on Jan. 7, 2014]; Retrieved from the Internet URL: https://linksmanager.com/Frequently+Asked+Questions+-+General+Information; 8 pages.

"Google's Search Results Can Deep-Link to Your Android Apps," [online][Retrieved on Dec. 13, 2013]; Retrieved from the Internet URL: techcrunch.com/2013/10/31/android-4-4-kitkat-app-indexing/; 6 pages.

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?" [online][Retrieved on Dec. 13, 2013]; Retrieved from stackoverflow.com/questions/13639564/how-to-get-a-deep-link-of-my-application-from-the-windows-phone-marketplace-usin; 2 pages.

"Indexing apps just like websites," [online][Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online][Retrieved on Dec. 16, 2013]; Retrieved from the Internet URL: chrome.blogspot.jp/2011/08/instant-pages-on-google-chrome.html; 3 pages.

"Mobile deep linking," [online][Retrieved on Dec. 13, 2013]; Retrieved from the Internet URL: en.wikipedia.org/wiki/Mobile_deep_linking; 2 pages.

"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Ready for a "Web" of Apps? Quixey Launches AppURL, A New Way to Enable Deep Linking Across Mobile Applications," [online][Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online][Retrieved on Jan. 7, 2014]; Retrieved from the Internet URL: https://developers.google.com/+/mobile/android/share/#handling_incoming_deep_links; 2 pages.

\* cited by examiner

VERIFICATION OF NATIVE APPLICATIONS FOR INDEXING

CROSS-REFERENCE TO RELATED APPLICATIONS

This application claims the benefit of U.S. Provisional Patent Application Ser. No. 61/955,762, filed on Mar. 19, 2014, the entire disclosure of which is incorporated herein by reference.

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc. Search engines crawl and index these resources to facilitate searching of the resources.

Furthermore, with the advent of tablet computers and smart phones, native applications that facilitate the performance of the same functions facilitated by the use of web page resources are now being provided in large numbers. Additionally, native applications that do not have websites with synchronous content, such as games, are also very popular on tablet computers and smart phones. Accordingly, search engines now also facilitate searching of these native applications.

One process by which search engines gather information for native applications is by accessing "deep links" for native applications. A deep link is an instruction specifying a particular environment instance of a native application and configured to cause the native application to instantiate the environment instance of the specified native application when selected at a user device. The native application generates the environment instance for display within the native application on a user device. For example, a deep link may specify a selection menu for a game environment; or a particular selection of a song for a music application; or a particular recipe for a cooking application; and the like.

Some search systems now also facilitate the searching of native applications along with web pages and other web resources. However, for a search system to index a native application and the content the native application provides for deep links, the search engine may need to launch the native application for each deep link.

SUMMARY

This specification describes technologies relating to indexing verification of native applications.

In general, one innovative aspect of the subject matter described in this specification can be embodied in methods that include the actions of receiving a plurality of native applications, and for each native application: determining a set of links for the native application, for each link in the set of links for the native application, determining, by a data processing apparatus, whether the link causes the native application to correctly instantiate an environment instance specified by the link, for each link in that causes the native application to correctly instantiate, determining, by the data processing apparatus, whether content specified by the link is verified, generating reporting data describing the determinations of whether the links cause the native application to correctly instantiate the environment instances specified by the links and the determinations of whether content specified by the links are verified, and making the reporting data available to a provider of the native application. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving, for each native application of a plurality of native applications, a native application package for the native application, the native application package including the native application and metadata describing linking schemes for the native application; for each native application: determining a first set of links for the native application, for each link in the first set of links for the native application, determining, by a data processing apparatus, whether the link causes the native application to correctly instantiate an environment instance specified by the link, for each link in that causes the native application to correctly instantiate, determining, by the data processing apparatus, whether content specified by the link is verified, based on the determinations of whether the links causes the native application to correctly instantiate an environment instance specified by the link and the determinations of whether content specified by the link is verified, determining whether to determine a second set of links for the native application, wherein the first set of links are a proper subset of the second set of links; for only each native application for which it is determined to determine a second set of links for the native application: determining the second set of links for the native application, for each link in the second set of links for the native application, determining, by the data processing apparatus, whether the link causes the native application to correctly instantiate an environment instance specified by the link, for each link in that causes the native application to correctly instantiate, determining, by the data processing apparatus, whether content specified by the link is verified, generating reporting data describing the determinations of whether the links causes the native application to correctly instantiate an environment instance specified by the link and the determinations of whether content specified by the link is verified and making the reporting data to a provider of the native application. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The system provides a framework for the discovery of native application links, including deep links and other links from which a native application may request content, and for verification that the native application and the links operate correctly and are thus acceptable for indexing and for serving search results from the resulting index data. The system can identify subsets of links that cause the native application to correctly instantiate, and only index the content for those links. This eliminates indexing of content for links that, for a variety of reasons, may result in a poor user experience if a user attempts to instantiate a native application using the links.

The system provides a user interface for submitting a native application and corresponding deep links for testing, and also provides a detailed report summarizing various failures encountered during testing. Using these reports, a native application publisher can proactively focus its efforts on correcting erroneous links or fixing unforeseen application bugs before such errors are exposed to users. The system also checks for backwards compatibility of a native application for deep links verified for earlier versions of the native application. In implementations in which a deep link no longer works with a later version, the deep links may be purged from the index, and a user using an older version of the native application will see fewer deep links in native application search results. This will signal the user that their native application is out of date, and will motivate the user to update to the latest version of the native application. Alternatively, the deep links may be preserved in the index, but only served when the version of native application installed on a user device is verified to work with the particular deep link.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system receives a native application and determines a set of deep links for the native application, and then verifies whether the native application and the deep links are suitable for crawling and indexing. As used herein, a native application generates environment instances for display on a user device within an environment of the native application, and operates independent of a browser application on the user device. A native application is an application specifically designed to run on a particular user device operating system and machine firmware. Native applications thus differ from browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific.

Each deep link specifies a particular environment instance of the native application and is configured to cause the native application to instantiate an instance of the specified native application. For each link in a set of links for the native application, the system determines whether the link causes the native application to correctly instantiate an environment instance specified by the link. For example, the system will verify that, in response to selecting a deep link, the native application launches, and verifies that the native application does not experience errors during launching. For each link in that causes the native application to correctly instantiate, the system determines whether content specified by the link is verified. For example, the system determines whether the native application actually receives content in response to a request generated by processing the deep link. By way of another example, if the deep link is specified as providing content consistent with a corresponding web page, the system verifies that the content received in response to the deep link request is consistent with the content received from the web page. The system then generates reporting data describing the determinations of whether the links cause the native application to correctly instantiate the environment instances specified by the links and the determinations of whether content specified by the links are verified, and then makes the reporting data available to a provider of the native application.

The system may also, in addition to generating the reporting data, index the data for deep links that cause the native application to correctly instantiate and for which the content is also verified. The indexed data may then be searched in response to search queries from users.

These features and additional feature are described in more detail below.

Figure 1:
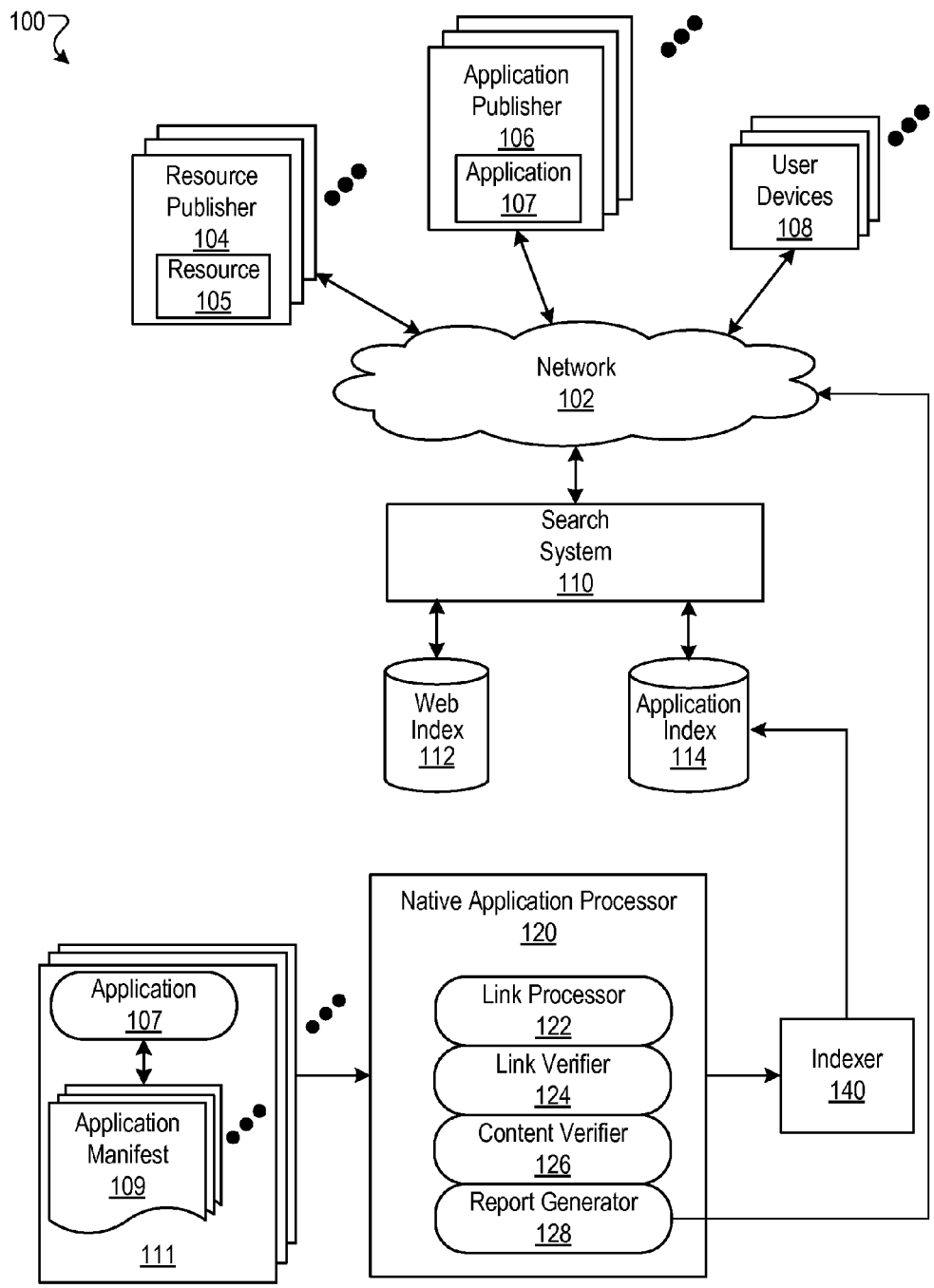
FIG. 1 is a block diagram of an example environment in which native applications are verified for indexing and searching.

FIG. 1 is a block diagram of an example environment 100 in which native applications are verified for indexing and searching. A computer network 102, such as the Internet, connects resource publisher web sites 104, application publishers 106, user devices 108 and a search system 110.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. As described above, a native application 107 is an application specifically designed to run on a particular user device operating system and machine firmware. As used in this specification, an "environment instance" is a display environment within a native application and in which is displayed content, such as text, images, and the like. An environment instance is specific to the particular native application, and the native application is specific to the particular operating system of the user device 108. An environment instance differs from a rendered web resource in that the environment instance is generated within and specific to the native application, while a web resource may be rendered in any browser for which the web page resource is compatible, and is independent of the operating system of the user device.

A user device 108 is an electronic device that is under the control of a user. A user device 108 is typically capable of requesting and receiving web page resources 104 and native applications 107 over the network 102. Example user devices 108 include personal computers, mobile communication devices, and tablet computers.

To search web resources 105 and the native applications 107, the search system 110 accesses a web index 112 and an application index 114. The web index 112 is an index of web resources 105 that has, for example, been built from crawling the publisher web sites 104. The application index 114 is an index of environment instances for native applications 107, and is constructed using a native application processor 120 and an indexing process that is described in more detail below. Although shown as separate indexes, the web index 112 and the application index 114 can be combined in a single index.

The user devices 108 submit search queries to the search system 110. In response to each query, the search system 110 accesses the web index 112 and the application index 114 to identify resources and applications, respectively, that are relevant to the query. The search system 110 may, for example, identify the resources and applications in the form of web resource search results and native application search results, respectively. Once generated, the search results are provided to the user device 108 from which the query was received.

A web resource search result is data generated by the search system 110 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114 of environment instances. A native application search result includes a "deep link" specifying a particular environment instance of the native application and which is configured to cause the native application to instantiate the specified environmental instance. For example, selection of a native application search result may cause the native application to launch (if installed on the user device 108) and generate an environment instance referenced in the application search result in the form of a screen shot.

As described above, publishers 106 that provide native applications 107 also provide deep links to the search system 110. Furthermore, third parties may also provide deep links for native applications. Additionally, the search system 110 can discover deep links from other multiple sources, such as application site maps, web page annotations, etc., and thus the set of deep links may be constantly changing. For example, an application publisher may provide a list of deep links 109 in the form of uniform resource identifiers (URIs) (or other instruction types that are specific to the native application published by the publisher). These deep links are deep links that publisher 106 desires to be crawled and indexed in the application index 114. Such deep links typically may not be specific to any version of the application, and are provided at various times independent of version updates.

Publishers 106 are also providing updates to their native applications 107. These updates are provided for a variety of reasons, including bug fixes, content updates, added functionality, etc. Often, however, the updates do not affect the deep linking scheme of the native application, and thus the publishers 106 may not test deep links for version compatibility. Instead, the publishers 106 often assume prior deep links will work correctly with new application versions, and that deep links provided after a newer version of an application is released will be compatible for an older version of an application. However, these assumptions may not always hold true.

Furthermore, changes to a native application may render it inoperable on the native application processor 120 or incompatible with the native application processor 120. For example, a new version of a native application may incorporate a new library that does not work correctly with the native application processor 120, or may incorporate a new user interface handler that precludes the native application processor 120 from accessing content displayed by the native application.

Thus, to help facilitate the crawling and indexing of native applications, the native application processor 120 implements a screening process that is used to verify a native application for indexing. The verification process aids native application providers, such as developers, in understanding errors or other issues that may occur when the native application processor 120 attempts to crawl and index a native application. The errors may be minor, such as several deep links that fail to provide requested content to the native application, or may be major, such as the native application failing to launch on the native application processor 120. These errors may be summarized in the form of a report for the native application provider.

In some implementations, the native application processor 120 provides a user interface for specifying a native application to be verified and a user interface detailing the results of the verification process. The user interfaces are shown in FIGS. 2A and 2B.

Figures 2A, 2B:
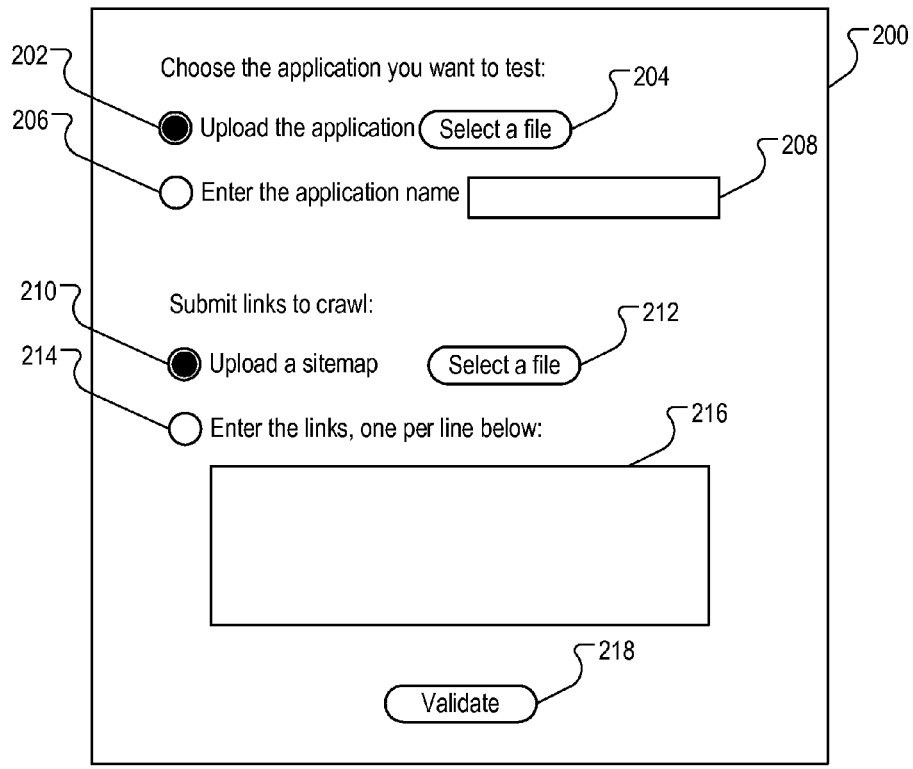
FIG. 2A is an illustration of a user interface for submitting a native application and links for verification.
FIG. 2B is an illustration of a user interface for displaying reporting data summarizing results of a verification process for a native application.

In particular, FIG. 2A is an illustration of a user interface 200 for submitting a native application and links for verification, and FIG. 2B is an illustration of a user interface 220 for displaying reporting data summarizing results of a verification process for a native application.

With reference to FIG. 2A, a provider may select from options 202 and 206 to provide a native application. For example, option 202 allows the user to upload the native application by use of a file upload option 204. Alternatively, option 206 allows the provider to enter an application name in an application name field 208, which will cause the native application processor 120 to search for the application.

In some implementations, only the application binary need be provided. In other implementations, the provider may provide an application package, which is an archive that facilitates the installation, maintenance and removal of the application on a device. The application package may include the application binary in a library directory, a manifest file that lists the files which are included in the application package, intents or functions supported, a linking scheme for the native application (such as a set of deep links), and other data. In the event an application package is provided, the native application processor 120 can derive the linking scheme and other addressing data for the native application for testing and verification.

A provider may also specify particular links to test. For example, option 210 allows the provider to upload a sitemap for the native application by use of a file upload option 212. Alternatively, option 214 allows the provider to enter application links in an input field. Selecting the validate command 218 causes the specified native application and deep links to be submitted to the native application processor 120.

Once the native application processor 120 receives the native application (or native application package) and determines a set of links to be tested, the native application processor performs a series of operational checks using the link processor 122, the link verifier 124, the content verifier 126, and the report generator 128. Operation of the native application processor 120 is described in more detail with reference to FIGS. 3 and 4 below. The architecture shown in FIG. 1 is but one example implementation, and other architectures and function distributions can also be used.

The results of the tests are summarized in reporting data, an example summary of which is shown in FIG. 2B. The reporting data 220 of FIG. 2B is for two applications, each represented by a row of data. Each row has a respective column field for the application name, the package name, the version, the date of the last test, and the results. In the example shown, the results are summarized by linked text, the selection of which will generate a request for more detailed reporting data. For the first application—Ex_AP1—the results are "All Passed," which indicates the native application processor 120 did not discover any errors or failures during the texting process. However, for the second application—Ex_AP2—there are several failure categories. In the example shown, the native application processor 120 discovered backward compatibility errors, indicating that one or more links that verified for an earlier version of the native application did not verify for the current version tested (version 1.1). Selection of the link "Backward Compatibility Failures" will cause the native application processor 120 to provide a detailed report regarding the failures, e.g., the deep links that failed, the reason(s) for the failures, etc. Likewise, the selection of the links "Like Timeouts" and "Launch Failures" will provide detailed reports regarding each respective set of failures.

A native application provider, by reviewing the report data, can thus focus its efforts on corrective actions, if any, that need to be taken to ensure that a native application and its corresponding deep links can be correctly processed by the native application processor 120.

Figure 3:
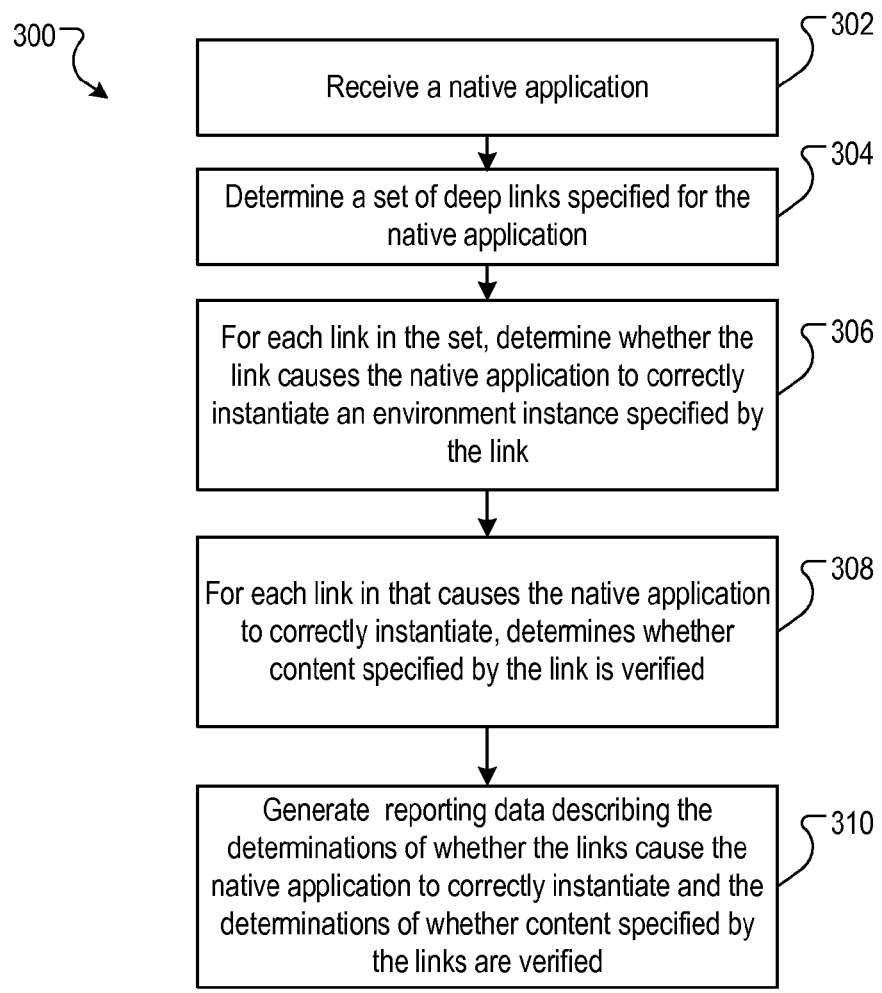
FIG. 3 is a flow diagram of an example process for verifying a native application for indexing and searching.

FIG. 3 is a flow diagram of an example process for verifying, indexing and serving deep links for native applications. The process 300 can be implemented in the native application processor 120. The native application process 120 can be, for example, executed on a data processing apparatus of one or more computers in data communication, and run an operating system emulator that emulates an operating system on which native applications are to be executed. Any appropriate instrumentation and corresponding handlers to monitor for errors, timeouts, and other conditions and signals that are indicative of native application failures or error can be used to realize the operations described below.

The process 300 receives a native application (302). As described above, a native application or native application package can be submitted by the application provider. Additionally, the native application processor 120 can be configured to proactively test certain native applications that have not yet been verified. For example, native applications that meet a popularity threshold, e.g., within the top N selling applications, may be evaluated if they have not yet been verified. This allows for discovery of certain native applications that may be properly crawled and indexed even if the native application provider has not submitted the native application for evaluation.

The process 300 receives a set of deep links specified for a native application (304). The deep links may be received from the publisher of a native application, or generated by the search system, or submitted by users. For example, the deep links may be the deep links submitted by the use of the user interface 200.

In some implementations, the application index 114 may have numerous additional links specific to the native application. The deep links may have been previously submitted by the provider, may have been discovered during crawls of resources by the search engine, or by other processes. The deep link processor 122 may determine a linking scheme, for example, from an application manifest for the native application, and search the application index 114 for additional deep links for the native application. Such a scheme may be, for example, a particular host name, address, or other data that can be used to identify links for the native application.

The process 300, for each link in the set, determines whether the link causes the native application to correctly instantiate an environment instance specified by the link (306). For example, the deep link verifier 124 may run an emulator of an operating system that executes the native application. Each deep link is selected to determine whether the link causes the native application to correctly instantiate an environment instance specified by the link. A variety of appropriate signals can be processed to determine correct instantiation of the environment instance. For example, an error message, a crash of the native application, or any other undesired or unexpected condition can indicate a failed instantiation. The absence of any such error, and/or the reception of data indicating a correct instantiation, such as confirmation data from a remote server, can indicate a verified instantiation.

The process 300, for each link that causes the native application to correctly instantiate, determines whether content specified by the link is verified (308). Content is verified if the content is received in response to a selection of a deep link, and the content optionally meets additional verification criteria. For example, the content verifier 120 may determine whether a content request generated by the native application in response to processing the link is successfully fulfilled, e.g., a request timeout or an unresolved link address may preclude verification of content. Likewise, malware and other checks can be performed on the received content.

In some implementations in which a native application and a web resource are determined to correspond, e.g., the native application may be a weather application that corresponds to a web page of an on-line weather provider, the content received at the native application may be checked for consistency with the content of the web page. For example, the content verifier 124 may determine a web page that is specified as corresponding to the link, where link is not a link to the web page, and in response determine whether content provided in respond to a content request generated by the native application in response to processing the link is consistent with content of the web page. Consistency can be checked, for example, by n-gram similarity checks, an entity matching check, formatting similarities, etc. The content is verified if it passes one or more consistency checks.

The process 300 generates reporting data describing the determinations of whether the links cause the native application to correctly instantiate and the determinations of whether content specified by the links are verified (310). The report generator 128 logs the results of each check for the native application and deep links, and summarizes the findings, for example, as summarized in FIG. 2B.

In addition to listing whether a deep link passed for failed verification, the reporting data may also include other performance metrics, such as how long each deep link took to respond to a request, the amount of data fetched for each deep link, and other data that may be of interest to the native application developer. For example, some deep links may be configured to cause the native application to render a "back" command that, when selected in the native application, causes the native application to close and the user device to revert to a search results page, or some other pre-defined resource. Data indicating whether such functionality tested successfully can be listed for each deep link that is configured to cause the native application to perform the configured function.

The process 300 described above may, in some implementations, be first implemented on a sampled set of deep links before processing an entire set of deep links. For example, a portion of a site map of links for a native application may be processed. If a success threshold is met, e.g., the native application instantiates successfully and content for at least N % of the links is verified successfully, then the native application processor 120 may process an entire set of deep links for the native application. In variations of this implementation, indexing of the native application content by the indexer 140 is not performed unless the sampled set of deep links is successfully verified.

The process 300 assumes that the version of the native application being tested runs on the native application processor. However, there may be situations in which the native application may be inoperable on the native application processor 120 or incompatible with the native application processor 120. For example, a new version of a native application may incorporate a new library that does not work correctly with the native application processor 120, or may incorporate a new user interface handler that precludes the native application processor 120 from accessing content displayed by the native application. Should this occur, the reporting data will include an entry that describes that the native application failed to launch on the native application processor.

Figure 4:
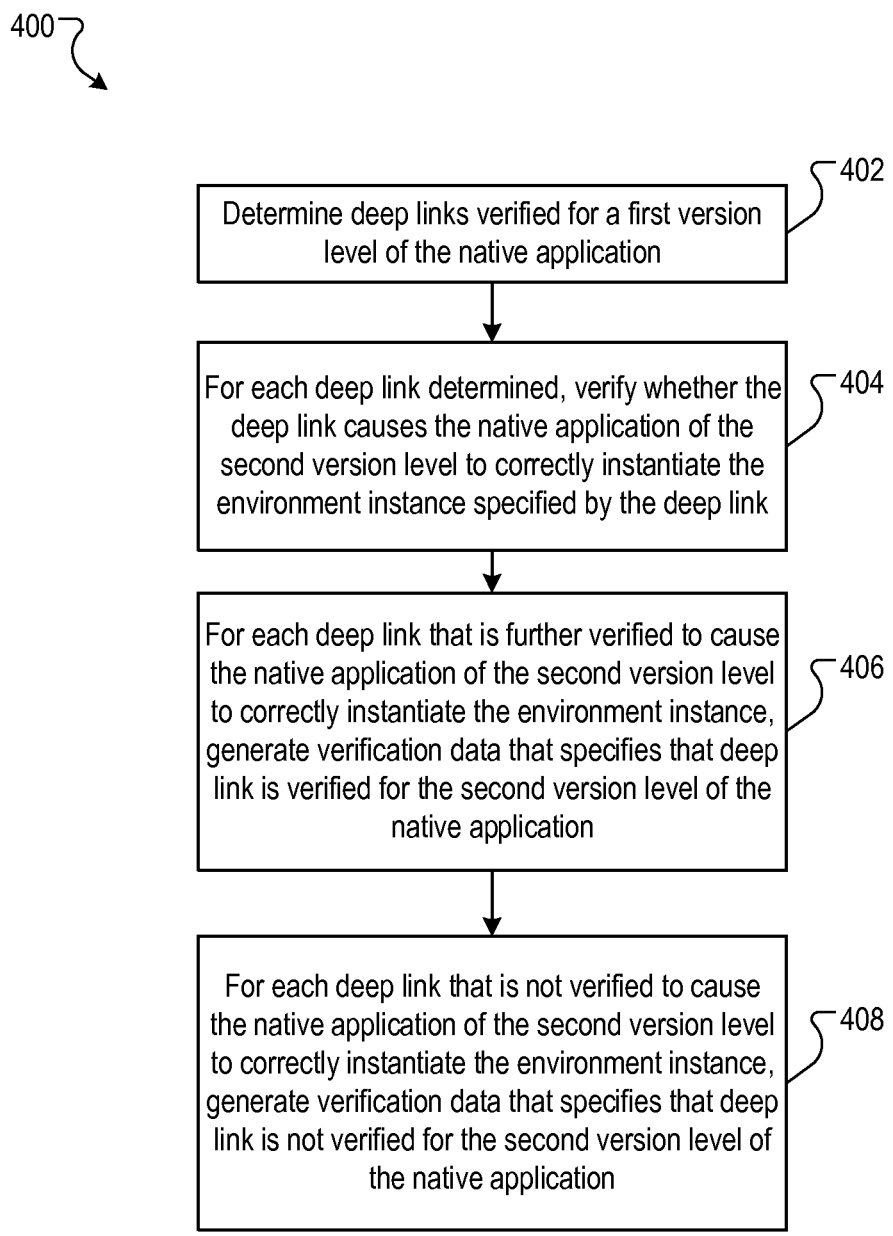
FIG. 4 is a flow diagram of an example process of verifying links for multiple version levels of a native application.

In some implementations, when a new version of a native application is released, the native application processor 120 may re-verify deep links previously verified for earlier versions of the native application for the latest version. FIG. 4 is a flow diagram of an example process of verifying and indexing deep links for multiple version levels. The process 400 can be implemented in a data processing apparatus of one or more computers in data communication.

The process 400 determines deep links verified for a first version level of the native application (402). For example, deep links verified for a prior version of a native application may be accessed when a new version of the native application is released and received by the search system 110.

The process 400, for each deep link determined, verifies whether the deep link causes the native application of the second version level to correctly instantiate the environment instance specified by the deep link (404). This process step is similar to process step 306 of FIG. 3. An additional check for content verification can also be performed, similar to step 308 of FIG. 3.

The process 400, for each deep link that is further verified to cause the native application of the second version level to correctly instantiate the environment instance, generates verification data that specifies that deep link is verified for the second version level of the native application (406).

Conversely, the process 400, for each deep link that is not verified to cause the native application of the second version level to correctly instantiate the environment instance, generates verification data that specifies that deep link is not verified for the second version level of the native application (408).

Thereafter, when a deep link is to be served to a user device, the deep link is served only if it is verified for the version level of the native application installed on the user device.

Figure 5:
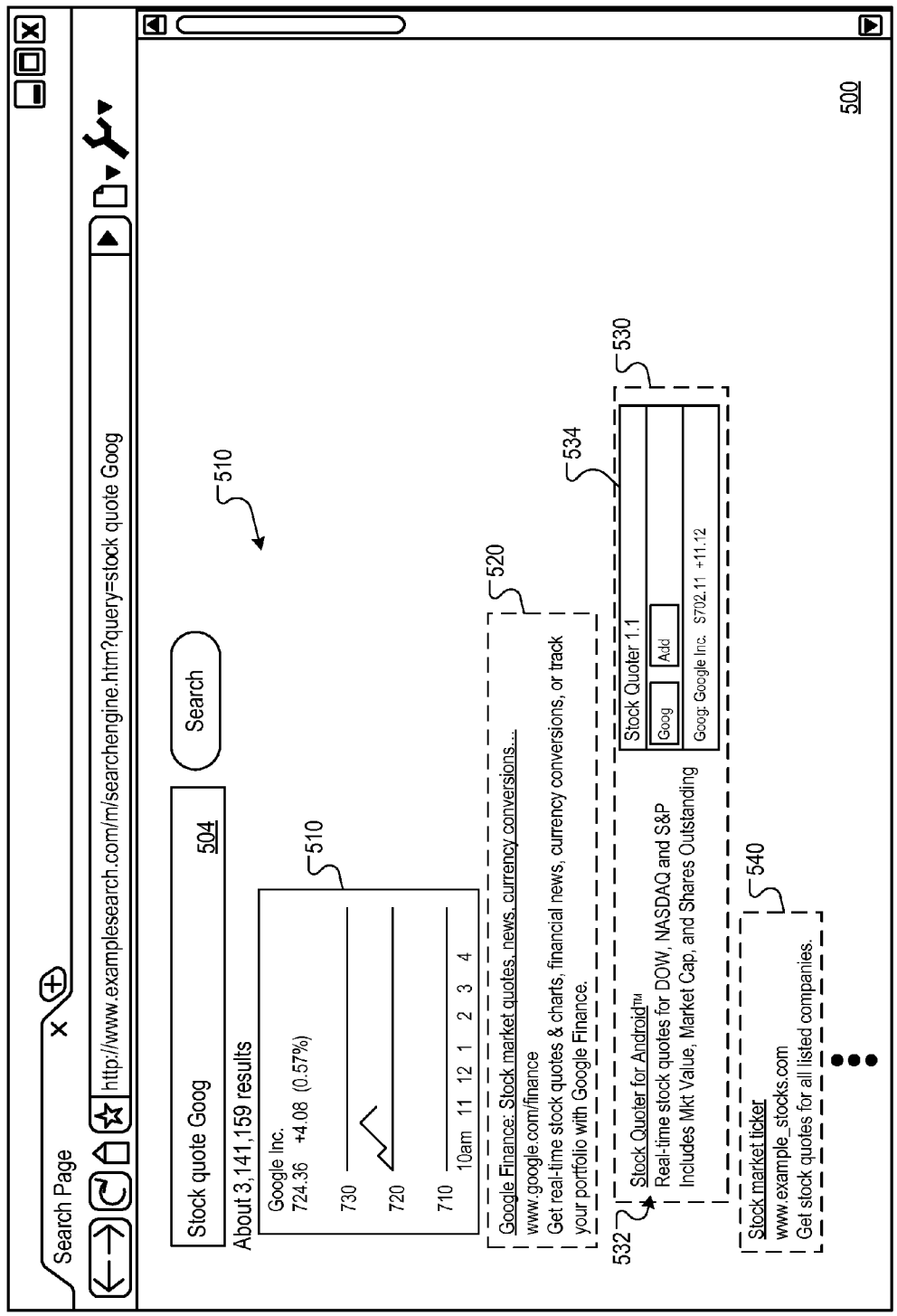
FIG. 5 is an illustration of a search results page that includes native application search results.

FIG. 5 is an illustration of a search results page 500 that includes native application search results. Displayed in the search results page 500 are search results 510, 520, 530, and 540 that are responsive to the query "Stock quote Goog" displayed in the search input field 504. The search result 510 is a real time search result that is generated, for example, in part from a real time feed. The search results 520 and 540 are web search results generated in response to a search of a web index 112 of resources. Each search result 520 and 540 references a resource that can be rendered in a browser application on a user device and includes a link to the resource, and other data, such as a snippet of text extracted for the referenced resource.

The search result 530 is a native application search result that is generated in response to a search of the application index 114 of environment instances. The search result 530 may include, for example, a snippet 532 of text and an image 534 of an environment instance. The snippet 534 may include, for example, the name of the native application (Stock Quoter for Andriod™) and text that has been extracted from one or more environment instances of the native application. Additional text can also be included, such as text from metadata.

The image 534 may be, for example, an image of a rendered environment instance. In some implementations, multiple images for a particular environment instance may be stored, and the image that is most relevant to the query may be selected. For example, as show in FIG. 5 the image 534 includes an image for a stock quote for the Goog symbol, and the image is selected because the search query specifies the Goog symbol. The virtual machine 120 may, for example, be configured to collect a series of images for a particular environment instance if the environment instance can be rendered for different input parameters (e.g., stock tickers, movie titles, etc.). In some implementations, the images that are stored may be for the N most popular values that are provided from users, e.g., the top 100 most requested stocks, the top 100 most requested movies, etc.

The native application search result 530 includes a deep link, and selection of the search result 530 at the user device causes the native application to launch and generate an instance of the environment instance that includes content that is relevant to the search query. For example, provided the native application Stock Quoter for Andriod™ is installed on the user device, selecting the image 534 causes the native application to launch and generate the environment instance that corresponds to the image 534 but with more current content. Furthermore, the environment instance is rendered to display the current stock quote for the Goog symbol. This can be accomplished, for example, by passing the input value of Goog in a command line for the native application.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:
   receiving a plurality of native applications, wherein each native application has a corresponding version level, the receiving including, for each native application, receiving a native application package that includes the native application and metadata describing linking schemes for the native application;
   for each native application:
      determining a set of links for the native application, the links including links specified for the corresponding version level and links specified for a prior version level that is an earlier version level than the corresponding version level;
      for each link in the set of links for the native application, determining, by a data processing apparatus, whether the link causes the native application to correctly instantiate an environment instance specified by the link, including determining whether a link specified for a prior version level causes the native application of the corresponding version level to correctly instantiate the environment instance specified by the link;
      for only each link specified for the prior version level that is determined to cause the native application of the corresponding version level to correctly instantiate the environment instance specified by the link, generating verification data that specifies that the link is verified for the corresponding version level;
      for only each link specified for the prior version level that is determined not to cause the native application of the corresponding version level to correctly instantiate the environment instance specified by the link, generating verification data that specifies that the link is not verified for the corresponding version level;
      for each link in the set of links that causes the native application to correctly instantiate, determining, by the data processing apparatus, whether content specified by the link is verified;
   generating reporting data describing the verification data for the links including the determinations of whether the links cause the native application to correctly instantiate the environment instances specified by the links, and the determinations of whether content specified by the links determined to cause the native application to correctly instantiate are verified; and
   making the reporting data available to a provider of the native application.

2. The computer-implemented method of claim 1, wherein:
   determining a set of links for the native application comprises searching a resource index for links specified for the corresponding version level and links specified for the prior version level that is an earlier version level than the corresponding version level.

3. The computer-implemented method of claim 1, wherein determining whether content specified by the link is verified comprises:
   determining whether a content request generated by the native application in response to processing the link is successfully fulfilled.

4. The computer-implemented method of claim 1, wherein determining whether content specified by the link is verified comprises:
   determining a web page that is specified as corresponding to the link, wherein the link is not a link to the web page; and
   determining whether content provided in response to a content request generated by the native application in response to processing the link is consistent with content of the web page.

5. The computer-implemented method of claim 1, wherein determining whether the link causes the native application to correctly instantiate an environment instance specified by the link comprises:
  selecting the link;
  determining whether the native application instantiates in response to the selection; and
  determining that the link does not cause the native application to correctly instantiate when the native application fails to instantiate.

6. The computer-implemented method of claim 1, wherein determining whether the link causes the native application to correctly instantiate an environment instance specified by the link comprises:
  selecting the link, causing the native application to instantiate; and
  determining whether the native application experiences one or more errors after instantiation.

7. The computer-implemented method of claim 1, wherein determining a set of links for the native application comprise receiving, from a provider of the native application, the set of links.

8. The computer-implemented method of claim 1, wherein receiving a native application comprises receiving the native application response to the native application meeting a popularity threshold.

9. The computer-implemented method of claim 1, wherein the links include uniform resource locators and uniform resource identifiers, the uniform resource identifiers being of a structure different from a structure of the uniform resource locators.

10. The computer-implemented method of claim 1, further comprising:
  providing, to a user device, instructions that cause the user device to generate a user interface that includes a first field and a second field, the first field being a field in which a user may specify a native application package and the second field being a field in which a user may specify links for the native application;
  wherein:
    receiving a native application comprises receiving a native application package specified by the user in the first field of the user interface; and
    determining a set of links for the native application comprises receiving a set of links specified by the user in the second field of the user interface.

11. The computer-implemented method of claim 10, wherein making the reporting data to a provider of the native application comprises:
  providing, to the user device, instructions that cause the user device to generate a user interface that displays the reporting data.

12. A system, comprising:
  a data processing apparatus; and
  software stored in a non-transitory computer readable storage medium storing instructions executable by the data processing apparatus and that upon such execution cause the data processing apparatus to perform operations comprising:
    receiving a plurality of native applications, wherein each native application has a corresponding version level, the receiving including, for each native application, receiving a native application package that includes the native application and metadata describing linking schemes for the native application;
    for each native application:
      determining a set of links for the native application, the links including links specified for the corresponding version level and links specified for a prior version level that is an earlier version level than the corresponding version level;
      for each link in the set of links for the native application, determining whether the link causes the native application to correctly instantiate an environment instance specified by the link, including determining whether a link specified for a prior version level causes the native application of the corresponding version level to correctly instantiate the environment instance specified by the link;
      for only each link specified for the prior version level that is determined to cause the native application of the corresponding version level to correctly instantiate the environment instance specified by the link, generating verification data that specifies that the link is verified for the corresponding version level;
      for only each link specified for the prior version level that is determined not to cause the native application of the corresponding version level to correctly instantiate the environment instance specified by the link, generating verification data that specifies that the link is not verified for the corresponding version level;
      for each link in the set of links that causes the native application to correctly instantiate whether content specified by the link is verified;
      generating reporting data describing the verification data for the links including the determinations of whether the links cause the native application to correctly instantiate the environment instances specified by the links, and the determinations of whether content specified by the links determined to cause the native application to correctly instantiate are verified; and
      making the reporting data available to a provider of the native application.

13. A non-transitory computer readable storage medium storing instructions executable by a data processing apparatus and that upon such execution cause the data processing apparatus to perform operations comprising:
  receiving a plurality of native applications, wherein each native application has a corresponding version level, the receiving including, for each native application, receiving a native application package that includes the native application and metadata describing linking schemes for the native application;
  for each native application:
    determining a set of links for the native application, the links including links specified for the corresponding version level and links specified for a prior version level that is an earlier version level than the corresponding version level;
    for each link in the set of links for the native application, determining, by a data processing apparatus, whether the link causes the native application to correctly instantiate an environment instance specified by the link, including determining whether a link specified for a prior version level causes the native application of the corresponding version level to correctly instantiate the environment instance specified by the link;
    for only each link specified for the prior version level that is determined to cause the native application of the corresponding version level to correctly instantiate the environment instance specified by the link, generating verification data that specifies that the link is verified for the corresponding version level;

for only each link specified for the prior version level that is determined not to cause the native application of the corresponding version level to correctly instantiate the environment instance specified by the link, generating verification data that specifies that the link is not verified for the corresponding version level;

for each link in the set of links that causes the native application to correctly instantiate, determining, by the data processing apparatus, whether content specified by the link is verified;

generating reporting data describing the verification data for the links including the determinations of whether the links cause the native application to correctly instantiate the environment instances specified by the links, and the determinations of whether content specified by the links determined to cause the native application to correctly instantiate are verified; and making the reporting data available to a provider of the native application.

14. A computer-implemented method performed by data processing apparatus comprising one or more computers in data communication, the method comprising:

receiving a plurality of native applications and, for each native application, metadata describing linking schemes for the native application, wherein each native application has a corresponding version level, the receiving including;

for each native application:

determining a set of links for the native application, the links including links specified for the corresponding version level and links specified for a prior version level that is an earlier version level than the corresponding version level;

for each link in the set of links for the native application, determining, by a data processing apparatus, whether the link causes the native application to correctly instantiate an environment instance specified by the link, including determining whether a link specified for a prior version level causes the native application of the corresponding version level to correctly instantiate the environment instance specified by the link;

for each link specified for the prior version level that is determined to cause the native application of the corresponding version level to correctly instantiate the environment instance specified by the link, generating verification data that specifies that the link is verified for the corresponding version level;

for each link specified for the prior version level that is determined not to cause the native application of the corresponding version level to correctly instantiate the environment instance specified by the link, generating verification data that specifies that the link is not verified for the corresponding version level;

generating reporting data describing the verification data for the links; and making the reporting data available to a provider of the native application.

15. The computer-implemented method of claim 14, wherein determining whether the link causes the native application to correctly instantiate an environment instance specified by the link comprises:

selecting the link;

determining whether the native application instantiates in response to the selection; and determining that the link does not cause the native application to correctly instantiate when the native application fails to instantiate.

16. The computer-implemented method of claim 14, wherein determining whether the link causes the native application to correctly instantiate an environment instance specified by the link comprises:

selecting the link, causing the native application to instantiate; and determining whether the native application experiences one or more errors after instantiation.

17. A system, comprising:

a data processing apparatus; and software stored in a non-transitory computer readable storage medium storing instructions executable by the data processing apparatus and that upon such execution cause the data processing apparatus to perform operations comprising:

receiving a plurality of native applications and, for each native application, metadata describing linking schemes for the native application, wherein each native application has a corresponding version level, the receiving including:

for each native application:

determining a set of links for the native application, the links including links specified for the corresponding version level and links specified for a prior version level that is an earlier version level than the corresponding version level;

for each link in the set of links for the native application, determining whether the link causes the native application to correctly instantiate an environment instance specified by the link, including determining whether a link specified for a prior version level causes the native application of the corresponding version level to correctly instantiate the environment instance specified by the link;

for each link specified for the prior version level that is determined to cause the native application of the corresponding version level to correctly instantiate the environment instance specified by the link, generating verification data that specifies that the link is verified for the corresponding version level;

for each link specified for the prior version level that is determined not to cause the native application of the corresponding version level to correctly instantiate the environment instance specified by the link, generating verification data that specifies that the link is not verified for the corresponding version level;

generating reporting data describing the verification data for the links; and making the reporting data available to a provider of the native application.

* * * * *